US007962391B2

(12) United States Patent
Simon et al.

(10) Patent No.: US 7,962,391 B2
(45) Date of Patent: Jun. 14, 2011

(54) SYSTEM AND METHOD FOR DETERMINING ELEGIBILITY AND ENROLLING MEMBERS IN VARIOUS PROGRAMS

(75) Inventors: Scott Howard Simon, Wilmington, DE (US); Nancy W. Woodall, Earleville, MD (US); Michael F. Nikithser, Pittsburgh, PA (US); Jon K. Forst, Annapolis, MD (US); Gregory Shields, Washington, DC (US)

(73) Assignee: JPMorgan Chase Bank, N.A., New York, NY (US)

( * ) Notice: Subject to any disclaimer, the term of this patent is extended or adjusted under 35 U.S.C. 154(b) by 333 days.

(21) Appl. No.: 12/271,180

(22) Filed: Nov. 14, 2008

(65) Prior Publication Data

US 2009/0070247 A1 Mar. 12, 2009

Related U.S. Application Data

(60) Division of application No. 11/745,320, filed on May 7, 2007, now Pat. No. 7,467,109, which is a continuation of application No. 09/739,880, filed on Dec. 20, 2000, now Pat. No. 7,295,999.

(51) Int. Cl.
G06Q 40/00 (2006.01)

(52) U.S. Cl. .............. 705/35; 705/36 R; 705/37; 705/38

(58) Field of Classification Search ............... 705/35–38
See application file for complete search history.

(56) References Cited

U.S. PATENT DOCUMENTS

| 3,634,669 A | 1/1972 | Soumas et al. |
|---|---|---|
| 4,254,474 A | 3/1981 | Cooper et al. |
| 4,338,587 A | 7/1982 | Chiappetti |
| 4,346,442 A | 8/1982 | Musmanno |
| 4,355,372 A | 10/1982 | Goldberg |
| 4,363,489 A | 12/1982 | Chodak et al. |
| 4,376,978 A | 3/1983 | Musmanno |
| 4,597,046 A | 6/1986 | Musmanno et al. |
| 4,598,367 A | 7/1986 | DeFrancesco et al. |
| 4,642,768 A | 2/1987 | Roberts |
| 4,674,042 A | 6/1987 | Hernandez et al. |
| 4,674,044 A | 6/1987 | Kalmus et al. |
| 4,736,294 A | 4/1988 | Le Grand |

(Continued)

FOREIGN PATENT DOCUMENTS

EP 0597316 5/1994

(Continued)

OTHER PUBLICATIONS

Roger et al., A Credit Scoring Model to Evaluate the Credit Worthiness of Credit Card Applicants, Developments in Marketing Science, vol. 5, 1982.

(Continued)

*Primary Examiner* — Narayanswamy Subramanian

(74) *Attorney, Agent, or Firm* — Hunton & Williams, LLP

(57) ABSTRACT

A system and method for determining eligibility of persons and enrolling those persons in various programs. For example, one embodiment is particularly suited for enrolling credit card members in payment programs. A program is selected, after which enrollment information is entered. The enrollment information is checked and verified, and the enrollment application is checked for eligibility. The enrollment may be either accepted or declined. The possibility of reiterative enrollment in more than one program is provided. A system is provided for tracking which payment programs are the most enticing for later feedback analysis.

9 Claims, 8 Drawing Sheets

U.S. PATENT DOCUMENTS

| | | |
|---|---|---|
| 4,739,478 A | 4/1988 | Roberts et al. |
| 4,750,121 A | 6/1988 | Halley et al. |
| 4,752,676 A | 6/1988 | Leonard et al. |
| 4,760,604 A | 7/1988 | Cooper |
| 4,774,663 A | 9/1988 | Musmanno et al. |
| 4,774,664 A | 9/1988 | Gottardy |
| 4,831,526 A | 5/1989 | Luchs |
| 4,859,187 A | 8/1989 | Peterson |
| 4,859,837 A | 8/1989 | Halpern |
| 4,866,634 A | 9/1989 | Reboh |
| 4,897,811 A | 1/1990 | Scofield |
| 4,903,201 A | 2/1990 | Wagner |
| 4,969,094 A | 11/1990 | Halley et al. |
| 4,972,504 A | 11/1990 | Daniel, Jr. |
| 5,007,084 A | 4/1991 | Materna et al. |
| 5,025,372 A | 6/1991 | Burton et al. |
| 5,041,972 A | 8/1991 | Frost |
| 5,056,019 A | 10/1991 | Schultz et al. |
| 5,093,907 A | 3/1992 | Hwong et al. |
| 5,122,950 A | 6/1992 | Mee |
| 5,164,904 A | 11/1992 | Sumner |
| 5,175,682 A | 12/1992 | Higashiyama |
| 5,189,608 A | 2/1993 | Lyons et al. |
| 5,220,500 A | 6/1993 | Baird |
| 5,220,501 A * | 6/1993 | Lawlor et al. .................. 705/40 |
| 5,227,874 A | 7/1993 | Von Kohorn |
| 5,231,571 A | 7/1993 | D'Agostino |
| 5,237,620 A | 8/1993 | Deaton |
| 5,245,535 A | 9/1993 | Weiss et al. |
| 5,278,751 A | 1/1994 | Adiano |
| 5,297,032 A | 3/1994 | Trojan et al. |
| 5,311,594 A | 5/1994 | Penzias |
| 5,321,833 A | 6/1994 | Chang et al. |
| 5,321,933 A | 6/1994 | Seifert et al. |
| 5,351,187 A | 9/1994 | Hassett |
| 5,381,470 A | 1/1995 | Cambray et al. |
| 5,396,621 A | 3/1995 | MacGregor et al. |
| 5,430,644 A | 7/1995 | Deaton et al. |
| 5,444,844 A | 8/1995 | Inoue |
| 5,448,471 A | 9/1995 | Deaton et al. |
| 5,481,647 A | 1/1996 | Brody |
| 5,483,444 A | 1/1996 | Heintzeman et al. |
| 5,490,060 A | 2/1996 | Malec |
| 5,502,805 A | 3/1996 | Anderson et al. |
| 5,513,102 A | 4/1996 | Auriemma |
| 5,523,942 A | 6/1996 | Tyler |
| 5,537,314 A | 7/1996 | Kanter |
| 5,550,734 A | 8/1996 | Tater |
| 5,551,021 A | 8/1996 | Harada |
| 5,583,778 A | 12/1996 | Wind |
| 5,592,590 A | 1/1997 | Jolly |
| 5,603,025 A | 2/1997 | Tabb |
| 5,606,496 A | 2/1997 | D'Agostino |
| 5,611,052 A | 3/1997 | Dykstra |
| 5,615,109 A | 3/1997 | Eder |
| 5,615,341 A | 3/1997 | Srikant |
| 5,621,812 A | 4/1997 | Deaton et al. |
| 5,623,591 A | 4/1997 | Cseri |
| 5,638,457 A | 6/1997 | Deaton et al. |
| 5,642,485 A | 6/1997 | Deaton et al. |
| 5,644,723 A | 7/1997 | Deaton et al. |
| 5,644,727 A | 7/1997 | Atkins |
| 5,649,114 A | 7/1997 | Deaton et al. |
| 5,649,116 A | 7/1997 | McCoy |
| 5,652,786 A | 7/1997 | Rogers |
| 5,655,085 A | 8/1997 | Ryan |
| 5,657,388 A | 8/1997 | Weiss |
| 5,657,437 A | 8/1997 | Bishop et al. |
| 5,657,460 A | 8/1997 | Egan et al. |
| 5,659,469 A | 8/1997 | Deaton et al. |
| 5,664,127 A | 9/1997 | Anderson et al. |
| 5,671,363 A | 9/1997 | Cristofich et al. |
| 5,675,746 A | 10/1997 | Marshall |
| 5,687,322 A | 11/1997 | Deaton et al. |
| 5,689,100 A | 11/1997 | Carrithers et al. |
| 5,689,650 A | 11/1997 | McClelland et al. |
| 5,704,044 A | 12/1997 | Tarter et al. |
| 5,710,889 A | 1/1998 | Clark et al. |
| 5,715,298 A | 2/1998 | Rogers |
| 5,717,865 A | 2/1998 | Stratmann |
| 5,721,847 A | 2/1998 | Johnson |
| 5,727,161 A | 3/1998 | Purcell, Jr. |
| 5,732,397 A | 3/1998 | DeTore |
| 5,734,838 A | 3/1998 | Robinson et al. |
| 5,758,328 A | 5/1998 | Giovannoli |
| 5,764,923 A | 6/1998 | Tallman et al. |
| 5,765,144 A * | 6/1998 | Larche et al. .................. 705/38 |
| 5,768,158 A | 6/1998 | Adler et al. |
| 5,774,878 A | 6/1998 | Marshall |
| 5,774,883 A | 6/1998 | Andersen et al. |
| 5,787,403 A | 7/1998 | Randle |
| 5,799,286 A | 8/1998 | Morgan et al. |
| 5,799,288 A | 8/1998 | Tanaka et al. |
| 5,802,502 A | 9/1998 | Gell |
| 5,812,968 A | 9/1998 | Hassan |
| 5,819,237 A | 10/1998 | Garman |
| 5,832,457 A | 11/1998 | O'Brien |
| 5,842,178 A | 11/1998 | Giovannoli |
| 5,848,400 A | 12/1998 | Chang |
| 5,852,811 A | 12/1998 | Atkins |
| 5,870,456 A | 2/1999 | Rogers |
| 5,870,721 A | 2/1999 | Norris |
| 5,873,096 A | 2/1999 | Lim |
| 5,875,437 A | 2/1999 | Atkins |
| 5,878,258 A | 3/1999 | Pizi |
| 5,878,403 A | 3/1999 | Agrawal |
| 5,893,079 A | 4/1999 | Cwenar |
| 5,913,202 A | 6/1999 | Motoyama |
| 5,918,217 A | 6/1999 | Maggioncalda |
| 5,920,848 A | 7/1999 | Schutzer |
| 5,924,094 A | 7/1999 | Sutter |
| 5,930,775 A | 7/1999 | McCauley |
| 5,940,811 A | 8/1999 | Norris |
| 5,940,812 A | 8/1999 | Tengel et al. |
| 5,949,044 A | 9/1999 | Walker et al. |
| 5,950,175 A | 9/1999 | Austin |
| 5,963,953 A | 10/1999 | Cram et al. |
| 5,970,467 A | 10/1999 | Alavi |
| 5,970,480 A | 10/1999 | Kalina |
| 5,974,396 A | 10/1999 | Anderson |
| 5,978,779 A | 11/1999 | Stein et al. |
| 5,983,206 A | 11/1999 | Oppenheimer |
| 5,987,434 A | 11/1999 | Libman |
| 5,991,736 A | 11/1999 | Ferguson et al. |
| 5,991,741 A | 11/1999 | Speakman et al. |
| 5,995,942 A | 11/1999 | Smith et al. |
| 5,999,907 A | 12/1999 | Donner |
| 6,006,205 A | 12/1999 | Loeb et al. |
| 6,008,817 A | 12/1999 | Gilmore, Jr. |
| 6,009,411 A | 12/1999 | Kepecs |
| 6,009,415 A | 12/1999 | Shurling et al. |
| 6,018,718 A | 1/2000 | Walker et al. |
| 6,018,722 A | 1/2000 | Ray et al. |
| 6,021,397 A | 2/2000 | Jones et al. |
| 6,026,370 A | 2/2000 | Jermyn |
| 6,029,139 A | 2/2000 | Cunningham et al. |
| 6,029,153 A | 2/2000 | Bauchner et al. |
| 6,029,195 A | 2/2000 | Herz |
| 6,032,125 A | 2/2000 | Ando |
| 6,032,136 A | 2/2000 | Brake, Jr. et al. |
| 6,044,371 A | 3/2000 | Person et al. |
| 6,055,510 A | 4/2000 | Henrick |
| 6,055,517 A | 4/2000 | Friend et al. |
| 6,061,661 A | 5/2000 | Hagan |
| 6,064,985 A | 5/2000 | Anderson |
| 6,064,986 A | 5/2000 | Edelman |
| 6,070,147 A | 5/2000 | Harms et al. |
| 6,073,115 A | 6/2000 | Marshall |
| 6,076,072 A | 6/2000 | Libman |
| 6,078,892 A | 6/2000 | Anderson et al. |
| 6,078,900 A | 6/2000 | Ettl et al. |
| 6,078,901 A | 6/2000 | Ching |
| 6,085,174 A | 7/2000 | Edelman |
| 6,088,686 A | 7/2000 | Walker et al. |
| 6,089,284 A | 7/2000 | Kaehler et al. |
| 6,092,050 A | 7/2000 | Lungren et al. |
| 6,097,391 A | 8/2000 | Wilcox |

| | | | |
|---|---|---|---|
| 6,105,007 A | 8/2000 | Norris |
| 6,108,641 A | 8/2000 | Kenna et al. |
| 6,115,697 A | 9/2000 | Gottstein |
| 6,119,933 A | 9/2000 | Wong et al. |
| 6,122,623 A | 9/2000 | Garman |
| 6,128,599 A | 10/2000 | Walker et al. |
| 6,141,666 A | 10/2000 | Tobin |
| 6,144,944 A | 11/2000 | Kurtzman et al. |
| 6,154,731 A | 11/2000 | Monks et al. |
| 6,154,732 A | 11/2000 | Tarbox |
| 6,157,918 A | 12/2000 | Shepherd |
| 6,161,098 A | 12/2000 | Wallman |
| 6,173,270 B1 | 1/2001 | Cristofich et al. |
| 6,178,408 B1 | 1/2001 | Copple et al. |
| 6,182,052 B1 * | 1/2001 | Fulton et al. ............. 705/5 |
| 6,182,059 B1 | 1/2001 | Angotti et al. |
| 6,183,140 B1 | 2/2001 | Singer et al. |
| 6,185,582 B1 | 2/2001 | Zellweger et al. |
| 6,188,403 B1 | 2/2001 | Sacerdoti et al. |
| 6,188,405 B1 | 2/2001 | Czerwinski et al. |
| 6,188,993 B1 | 2/2001 | Eng et al. |
| 6,189,787 B1 | 2/2001 | Dorf |
| 6,192,314 B1 | 2/2001 | Khavakh et al. |
| 6,195,092 B1 | 2/2001 | Dhond et al. |
| 6,195,644 B1 | 2/2001 | Bowie |
| 6,199,077 B1 | 3/2001 | Inala et al. |
| 6,202,052 B1 | 3/2001 | Miller |
| 6,202,053 B1 | 3/2001 | Christiansen et al. |
| 6,202,054 B1 * | 3/2001 | Lawlor et al. ............. 705/42 |
| 6,205,453 B1 | 3/2001 | Tucker et al. |
| 6,212,494 B1 | 4/2001 | Boguraev |
| 6,222,557 B1 | 4/2001 | Pulley, IV et al. |
| 6,222,914 B1 | 4/2001 | McMullin |
| 6,235,176 B1 | 5/2001 | Schoen et al. |
| 6,236,978 B1 | 5/2001 | Tuzhilin |
| 6,243,093 B1 | 6/2001 | Czerwinski et al. |
| 6,243,688 B1 | 6/2001 | Kalina |
| 6,249,775 B1 | 6/2001 | Freeman et al. |
| 6,256,649 B1 | 7/2001 | Mackinlay et al. |
| 6,263,320 B1 | 7/2001 | Danilunas et al. |
| 6,267,292 B1 | 7/2001 | Walker et al. |
| 6,269,346 B1 | 7/2001 | Cristofich et al. |
| 6,271,863 B1 | 8/2001 | Bose et al. |
| 6,278,981 B1 | 8/2001 | Dembo et al. |
| 6,278,996 B1 | 8/2001 | Richardson et al. |
| 6,282,551 B1 | 8/2001 | Anderson et al. |
| 6,292,786 B1 | 9/2001 | Deaton et al. |
| 6,298,303 B1 | 10/2001 | Khavakh et al. |
| 6,304,859 B1 | 10/2001 | Ryan et al. |
| 6,311,144 B1 | 10/2001 | Abu El Ata |
| 6,317,726 B1 | 11/2001 | O'Shaughnessy |
| 6,317,750 B1 | 11/2001 | Tortolani et al. |
| 6,321,212 B1 | 11/2001 | Lange |
| 6,324,524 B1 | 11/2001 | Lent et al. |
| 6,324,526 B1 | 11/2001 | D'Agostino |
| 6,327,573 B1 | 12/2001 | Walker et al. |
| 6,330,543 B1 | 12/2001 | Kepecs |
| 6,330,551 B1 * | 12/2001 | Burchetta et al. ............. 705/80 |
| 6,349,290 B1 | 2/2002 | Horowitz et al. |
| 6,349,291 B1 | 2/2002 | Varma |
| 6,360,188 B1 | 3/2002 | Freidman et al. |
| 6,363,393 B1 | 3/2002 | Ribitzky |
| 6,370,516 B1 | 4/2002 | Reese |
| 6,390,472 B1 | 5/2002 | Vinarsky |
| 6,401,079 B1 | 6/2002 | Kahn et al. |
| 6,405,175 B1 | 6/2002 | Ng |
| 6,405,181 B2 | 6/2002 | Lent et al. |
| 6,405,204 B1 | 6/2002 | Baker et al. |
| 6,409,080 B2 | 6/2002 | Kawagishi |
| 6,411,939 B1 | 6/2002 | Parsons |
| 6,411,947 B1 | 6/2002 | Rice et al. |
| 6,424,949 B1 | 7/2002 | Deaton et al. |
| 6,424,951 B1 | 7/2002 | Shurling et al. |
| 6,430,542 B1 | 8/2002 | Moran |
| 6,452,613 B1 | 9/2002 | Lefebvre et al. |
| 6,473,745 B2 | 10/2002 | Doerr et al. |
| 6,487,497 B2 | 11/2002 | Khavakh et al. |
| 6,490,569 B1 | 12/2002 | Grune et al. |
| 6,496,832 B2 | 12/2002 | Chi et al. |
| 6,502,080 B1 | 12/2002 | Eichorst et al. |
| 6,513,018 B1 | 1/2003 | Culhane |
| 6,513,019 B2 | 1/2003 | Lewis |
| 6,564,189 B1 | 5/2003 | Nycz |
| 6,567,791 B2 | 5/2003 | Lent et al. |
| 6,571,216 B1 | 5/2003 | Garg et al. |
| 6,578,012 B1 | 6/2003 | Storey |
| 6,594,640 B1 | 7/2003 | Postrel |
| 6,597,379 B1 | 7/2003 | Morris et al. |
| 6,601,044 B1 | 7/2003 | Wallman |
| 6,609,118 B1 | 8/2003 | Khedkar et al. |
| 6,622,130 B1 | 9/2003 | Shepherd |
| 6,624,752 B2 | 9/2003 | Klitsgaard et al. |
| 6,629,081 B1 * | 9/2003 | Cornelius et al. ............. 705/30 |
| 6,629,082 B1 | 9/2003 | Hambrecht et al. |
| 6,640,238 B1 | 10/2003 | Bowman-Amuah |
| 6,640,249 B1 | 10/2003 | Bowman-Amuah |
| 6,671,673 B1 | 12/2003 | Baseman et al. |
| 6,678,611 B2 | 1/2004 | Khavakh et al. |
| 6,721,743 B1 | 4/2004 | Sakakibara |
| 6,725,257 B1 | 4/2004 | Cansler et al. |
| 6,738,933 B2 | 5/2004 | Fraenkel et al. |
| 6,741,975 B1 | 5/2004 | Nakisa et al. |
| 6,785,661 B1 | 8/2004 | Mandler et al. |
| 6,820,061 B2 | 11/2004 | Postrel |
| 6,829,586 B2 | 12/2004 | Postrel |
| 6,836,763 B1 | 12/2004 | Munsil et al. |
| 6,842,739 B2 | 1/2005 | Postrel |
| 6,850,923 B1 | 2/2005 | Nakisa et al. |
| 6,865,547 B1 | 3/2005 | Brake, Jr. et al. |
| 6,889,198 B2 | 5/2005 | Kawan |
| 6,892,052 B2 | 5/2005 | Kotola et al. |
| 6,901,375 B2 | 5/2005 | Fernandez |
| 6,913,193 B1 | 7/2005 | Kawan |
| 6,915,271 B1 | 7/2005 | Meyer et al. |
| 6,920,611 B1 | 7/2005 | Spaeth et al. |
| 6,947,898 B2 | 9/2005 | Postrel |
| 6,957,191 B1 | 10/2005 | Belcsak et al. |
| 6,963,852 B2 | 11/2005 | Koresko |
| 6,970,830 B1 | 11/2005 | Samra et al. |
| 6,985,879 B2 | 1/2006 | Walker et al. |
| 6,985,880 B1 | 1/2006 | Hodgdon et al. |
| 6,999,938 B1 | 2/2006 | Libman |
| 6,999,943 B1 | 2/2006 | Johnson et al. |
| 7,006,978 B2 | 2/2006 | Lineberry et al. |
| 7,062,459 B1 | 6/2006 | Herbst et al. |
| 7,090,138 B2 | 8/2006 | Rettenmyer et al. |
| 7,107,243 B1 * | 9/2006 | McDonald et al. ............. 705/40 |
| 7,121,471 B2 | 10/2006 | Beenau et al. |
| 7,124,105 B2 | 10/2006 | Hilton |
| 7,133,846 B1 | 11/2006 | Ginter et al. |
| 7,171,385 B1 | 1/2007 | Dembo et al. |
| 7,181,427 B1 | 2/2007 | DeFrancesco et al. |
| 7,249,097 B2 | 7/2007 | Hutchison et al. |
| 7,249,099 B2 | 7/2007 | Ling |
| 7,256,903 B2 | 8/2007 | Ando |
| 7,295,999 B1 * | 11/2007 | Simon et al. ............. 705/36 R |
| 7,315,841 B1 | 1/2008 | McDonald et al. |
| 7,318,046 B1 * | 1/2008 | Wellons et al. ............. 705/38 |
| 7,333,948 B2 | 2/2008 | Bell et al. |
| 7,340,431 B1 | 3/2008 | McManus et al. |
| 7,349,866 B2 | 3/2008 | Schwarz, Jr. |
| 7,349,877 B2 | 3/2008 | Ballow et al. |
| 7,406,442 B1 | 7/2008 | Kottmeier, Jr. et al. |
| 7,409,364 B1 * | 8/2008 | Barton et al. ............. 705/35 |
| 7,444,301 B2 | 10/2008 | Conklin et al. |
| 7,467,096 B2 | 12/2008 | Antonucci et al. |
| 7,467,109 B1 * | 12/2008 | Simon et al. ............. 705/36 R |
| 7,480,631 B1 | 1/2009 | Merced et al. |
| 7,496,624 B2 | 2/2009 | Falter et al. |
| 7,499,907 B2 | 3/2009 | Brown et al. |
| 7,580,857 B2 | 8/2009 | VanFleet et al. |
| 7,613,629 B2 | 11/2009 | Antonucci et al. |
| 7,630,935 B2 | 12/2009 | Loeger et al. |
| 7,689,504 B2 | 3/2010 | Warren et al. |
| 7,729,925 B2 | 6/2010 | Maritzen et al. |
| 7,729,980 B2 | 6/2010 | Mittenzwei et al. |
| 7,734,518 B2 | 6/2010 | Toffey |
| 2001/0011243 A1 | 8/2001 | Dembo et al. |

| | | | | | | |
|---|---|---|---|---|---|---|
| 2001/0023407 A1 | 9/2001 | Liyanearachchi et al. | 2002/0161630 A1 | 10/2002 | Kern et al. | |
| 2001/0025253 A1 | 9/2001 | Heintz et al. | 2002/0161641 A1 | 10/2002 | Quinlan et al. | |
| 2001/0027437 A1 | 10/2001 | Turbeville et al. | 2002/0161679 A1 | 10/2002 | Randolph et al. | |
| 2001/0032189 A1 | 10/2001 | Powell | 2002/0165809 A1 | 11/2002 | Gendelman | |
| 2001/0034651 A1 | 10/2001 | Marks et al. | 2002/0169671 A1 | 11/2002 | Junger | |
| 2001/0034663 A1 | 10/2001 | Teveler et al. | 2002/0174011 A1 | 11/2002 | Sanchez et al. | |
| 2001/0034692 A1 | 10/2001 | McRedmond | 2002/0174016 A1 | 11/2002 | Cuervo | |
| 2001/0037243 A1 | 11/2001 | Rouston et al. | 2002/0174042 A1 | 11/2002 | Arena et al. | |
| 2001/0037268 A1 | 11/2001 | Miller | 2002/0174045 A1 | 11/2002 | Arena et al. | |
| 2001/0039511 A1 | 11/2001 | Duckworth et al. | 2002/0174081 A1 | 11/2002 | Charbonneau et al. | |
| 2001/0047342 A1 | 11/2001 | Cuervo | 2002/0178056 A1 | 11/2002 | Lim | |
| 2001/0049628 A1 | 12/2001 | Icho | 2002/0188509 A1 | 12/2002 | Ariff et al. | |
| 2001/0049651 A1 | 12/2001 | Selleck | 2002/0188511 A1 | 12/2002 | Johnson et al. | |
| 2001/0054003 A1 | 12/2001 | Chien et al. | 2002/0194071 A1 | 12/2002 | Yoshizaki et al. | |
| 2001/0056398 A1 | 12/2001 | Scheirer | 2002/0198797 A1 | 12/2002 | Cooper et al. | |
| 2002/0002495 A1 | 1/2002 | Ullman | 2002/0198803 A1 | 12/2002 | Rowe | |
| 2002/0004742 A1 | 1/2002 | Willcocks et al. | 2003/0004794 A1 | 1/2003 | Hamilton | |
| 2002/0007313 A1 | 1/2002 | Mai et al. | 2003/0004803 A1 | 1/2003 | Glover et al. | |
| 2002/0007330 A1 | 1/2002 | Kumar et al. | 2003/0004809 A1 | 1/2003 | Palcic et al. | |
| 2002/0010621 A1 | 1/2002 | Bell et al. | 2003/0009374 A1 | 1/2003 | Moodie et al. | |
| 2002/0011517 A1 | 1/2002 | Namekawa et al. | 2003/0009379 A1 | 1/2003 | Narasimhan et al. | |
| 2002/0019791 A1 | 2/2002 | Goss et al. | 2003/0009393 A1 | 1/2003 | Norris | |
| 2002/0019802 A1 | 2/2002 | Malme et al. | 2003/0014265 A1* | 1/2003 | Landry et al. | 705/1 |
| 2002/0019803 A1 | 2/2002 | Muller | 2003/0018492 A1 | 1/2003 | Carlson | |
| 2002/0023051 A1* | 2/2002 | Kunzle et al. ............. 705/38 | 2003/0018523 A1 | 1/2003 | Rappaport et al. | |
| 2002/0026395 A1 | 2/2002 | Peterson | 2003/0028466 A1 | 2/2003 | Jenson et al. | |
| 2002/0026401 A1 | 2/2002 | Hueler | 2003/0036952 A1 | 2/2003 | Panttaja et al. | |
| 2002/0032622 A1 | 3/2002 | Petit et al. | 2003/0040964 A1 | 2/2003 | Lacek | |
| 2002/0040344 A1 | 4/2002 | Preiser et al. | 2003/0050831 A1 | 3/2003 | Klayh | |
| 2002/0042742 A1 | 4/2002 | Glover et al. | 2003/0050882 A1 | 3/2003 | Degen et al. | |
| 2002/0042774 A1 | 4/2002 | Ortiz et al. | 2003/0055754 A1 | 3/2003 | Sullivan | |
| 2002/0046110 A1 | 4/2002 | Gallagher | 2003/0061093 A1 | 3/2003 | Todd | |
| 2002/0046116 A1 | 4/2002 | Hohle et al. | 2003/0061097 A1 | 3/2003 | Walker et al. | |
| 2002/0052778 A1 | 5/2002 | Murphy et al. | 2003/0061098 A1 | 3/2003 | Meyer | |
| 2002/0055874 A1 | 5/2002 | Cohen | 2003/0061132 A1 | 3/2003 | Yu, Sr. et al. | |
| 2002/0059093 A1 | 5/2002 | Barton et al. | 2003/0061137 A1 | 3/2003 | Leung et al. | |
| 2002/0059103 A1 | 5/2002 | Anderson et al. | 2003/0069808 A1 | 4/2003 | Cardno | |
| 2002/0059139 A1* | 5/2002 | Evans ....................... 705/40 | 2003/0074167 A1 | 4/2003 | Browne et al. | |
| 2002/0062253 A1 | 5/2002 | Dosh et al. | 2003/0083933 A1 | 5/2003 | McAlear | |
| 2002/0065735 A1 | 5/2002 | Hatakama et al. | 2003/0088462 A1 | 5/2003 | Carrither et al. | |
| 2002/0067373 A1 | 6/2002 | Roe et al. | 2003/0088470 A1 | 5/2003 | Cuervo | |
| 2002/0069104 A1 | 6/2002 | Beach et al. | 2003/0093351 A1 | 5/2003 | Sarabanchong | |
| 2002/0069109 A1 | 6/2002 | Wendkos | 2003/0097298 A1 | 5/2003 | Klimpl et al. | |
| 2002/0070270 A1 | 6/2002 | Narita et al. | 2003/0105689 A1 | 6/2003 | Chandak et al. | |
| 2002/0072931 A1 | 6/2002 | Card | 2003/0115100 A1 | 6/2003 | Teicher | |
| 2002/0072974 A1 | 6/2002 | Pugliese et al. | 2003/0120544 A1 | 6/2003 | Gritzbach et al. | |
| 2002/0073005 A1 | 6/2002 | Welnicki et al. | 2003/0139827 A1 | 7/2003 | Phelps | |
| 2002/0077890 A1 | 6/2002 | LaPointe et al. | 2003/0144902 A1 | 7/2003 | Bowie | |
| 2002/0077895 A1 | 6/2002 | Howell | 2003/0158776 A1 | 8/2003 | Landesmann | |
| 2002/0077904 A1 | 6/2002 | Ali | 2003/0158818 A1 | 8/2003 | George et al. | |
| 2002/0078086 A1 | 6/2002 | Alden et al. | 2003/0171992 A1 | 9/2003 | Blagg et al. | |
| 2002/0082920 A1 | 6/2002 | Austin et al. | 2003/0187783 A1 | 10/2003 | Arthus et al. | |
| 2002/0087349 A1 | 7/2002 | Wong | 2003/0195780 A1 | 10/2003 | Arora et al. | |
| 2002/0091567 A1 | 7/2002 | Royston | 2003/0195805 A1 | 10/2003 | Storey | |
| 2002/0091622 A1 | 7/2002 | Mastwyk et al. | 2003/0200141 A1 | 10/2003 | Robison | |
| 2002/0099601 A1 | 7/2002 | Farrell | 2003/0200142 A1 | 10/2003 | Hicks et al. | |
| 2002/0099640 A1 | 7/2002 | Lange | 2003/0205617 A1 | 11/2003 | Allen et al. | |
| 2002/0107731 A1 | 8/2002 | Teng | 2003/0208400 A1 | 11/2003 | Kuo et al. | |
| 2002/0111850 A1 | 8/2002 | Smrckas et al. | 2003/0208483 A1 | 11/2003 | Satomi et al. | |
| 2002/0111859 A1 | 8/2002 | Sheldon et al. | 2003/0212628 A1 | 11/2003 | Kuttan et al. | |
| 2002/0111860 A1 | 8/2002 | Jones | 2003/0216964 A1 | 11/2003 | MacLean et al. | |
| 2002/0111861 A1 | 8/2002 | Sakamoto et al. | 2003/0216965 A1 | 11/2003 | Libman | |
| 2002/0111890 A1 | 8/2002 | Sloan et al. | 2003/0216967 A1 | 11/2003 | Williams | |
| 2002/0116266 A1 | 8/2002 | Marshall | 2003/0216998 A1 | 11/2003 | Chang et al. | |
| 2002/0120497 A1 | 8/2002 | King | 2003/0220834 A1 | 11/2003 | Leung et al. | |
| 2002/0123926 A1 | 9/2002 | Bushold et al. | 2003/0225618 A1 | 12/2003 | Hessburg et al. | |
| 2002/0123955 A1 | 9/2002 | Andreski et al. | 2003/0225619 A1 | 12/2003 | Dokken et al. | |
| 2002/0128916 A1 | 9/2002 | Beinecke | 2003/0229582 A1* | 12/2003 | Sherman et al. ............ 705/38 | |
| 2002/0133383 A1 | 9/2002 | Chao et al. | 2003/0233278 A1 | 12/2003 | Marshall | |
| 2002/0133401 A1 | 9/2002 | Mount et al. | 2003/0236712 A1 | 12/2003 | Antonucci et al. | |
| 2002/0133445 A1 | 9/2002 | Lessin | 2004/0006487 A1 | 1/2004 | Tari | |
| 2002/0143614 A1 | 10/2002 | MacLean et al. | 2004/0010447 A1 | 1/2004 | Asayama | |
| 2002/0143621 A1 | 10/2002 | Donnelly et al. | 2004/0015394 A1 | 1/2004 | Mok et al. | |
| 2002/0143626 A1 | 10/2002 | Voltmer et al. | 2004/0019540 A1 | 1/2004 | William et al. | |
| 2002/0147633 A1 | 10/2002 | Rafizadeh | 2004/0019541 A1 | 1/2004 | William et al. | |
| 2002/0147668 A1 | 10/2002 | Smith et al. | 2004/0024665 A1 | 2/2004 | Foster | |
| 2002/0152118 A1 | 10/2002 | Hadjigeorgis | 2004/0030626 A1 | 2/2004 | Libman | |
| 2002/0152123 A1 | 10/2002 | Giordano et al. | 2004/0039588 A1 | 2/2004 | Libman | |
| 2002/0152179 A1 | 10/2002 | Racov | 2004/0039667 A1 | 2/2004 | Winklevoss et al. | |

| | | |
|---|---|---|
| 2004/0054610 A1 | 3/2004 | Amstutz et al. |
| 2004/0054622 A1 | 3/2004 | Strayer et al. |
| 2004/0078328 A1 | 4/2004 | Talbert et al. |
| 2004/0117300 A1 | 6/2004 | Jones et al. |
| 2004/0186773 A1 | 9/2004 | George et al. |
| 2004/0210498 A1 | 10/2004 | Freund |
| 2004/0215507 A1 | 10/2004 | Levitt et al. |
| 2004/0236641 A1 | 11/2004 | Abbott et al. |
| 2004/0236688 A1 | 11/2004 | Bozeman |
| 2004/0243468 A1 | 12/2004 | Cohagan et al. |
| 2004/0249660 A1 | 12/2004 | Williams et al. |
| 2004/0249710 A1 | 12/2004 | Smith et al. |
| 2004/0249712 A1 | 12/2004 | Brown et al. |
| 2004/0267651 A1 | 12/2004 | Jenson et al. |
| 2005/0004839 A1 | 1/2005 | Bakker et al. |
| 2005/0004855 A1 | 1/2005 | Jenson et al. |
| 2005/0004856 A1 | 1/2005 | Brose et al. |
| 2005/0010510 A1 | 1/2005 | Brose et al. |
| 2005/0021405 A1 | 1/2005 | Agarwal |
| 2005/0021457 A1 | 1/2005 | Johnson et al. |
| 2005/0023346 A1 | 2/2005 | Bakker et al. |
| 2005/0027632 A1 | 2/2005 | Zeitoun et al. |
| 2005/0033637 A1 | 2/2005 | Underwood |
| 2005/0049965 A1 | 3/2005 | Jen |
| 2005/0055270 A1 | 3/2005 | Broe |
| 2005/0060252 A1 | 3/2005 | Doddington |
| 2005/0065877 A1 | 3/2005 | Cleary et al. |
| 2005/0071225 A1 | 3/2005 | Bortolin et al. |
| 2005/0071226 A1 | 3/2005 | Nguyen et al. |
| 2005/0071227 A1 | 3/2005 | Hammad et al. |
| 2005/0075889 A1 | 4/2005 | Gomes et al. |
| 2005/0080672 A1 | 4/2005 | Courtion et al. |
| 2005/0086103 A1 | 4/2005 | Agura et al. |
| 2005/0091104 A1 | 4/2005 | Abraham |
| 2005/0091138 A1 | 4/2005 | Awatsu |
| 2005/0096976 A1 | 5/2005 | Nelms |
| 2005/0102178 A1 | 5/2005 | Phillips et al. |
| 2005/0108090 A1 | 5/2005 | Takeda et al. |
| 2005/0119938 A1 | 6/2005 | Smith et al. |
| 2005/0125292 A1 | 6/2005 | Kassab et al. |
| 2005/0131761 A1 | 6/2005 | Trika et al. |
| 2005/0131792 A1 | 6/2005 | Rowe |
| 2005/0144071 A1 | 6/2005 | Monahan et al. |
| 2005/0144074 A1 | 6/2005 | Fredregill et al. |
| 2005/0144105 A1 | 6/2005 | Czyzewski |
| 2005/0144108 A1 | 6/2005 | Loeper |
| 2005/0149386 A1 | 7/2005 | Agura et al. |
| 2005/0149393 A1 | 7/2005 | Leof |
| 2005/0160003 A1 | 7/2005 | Berardi et al. |
| 2005/0171839 A1 | 8/2005 | Corriere |
| 2005/0171842 A1 | 8/2005 | Tien et al. |
| 2005/0177503 A1 | 8/2005 | Thomas |
| 2005/0187820 A1 | 8/2005 | Mohan |
| 2005/0192862 A1 | 9/2005 | Modi |
| 2005/0197904 A1 | 9/2005 | Baron et al. |
| 2005/0203824 A1 | 9/2005 | Freud et al. |
| 2005/0205666 A1 | 9/2005 | Ward et al. |
| 2005/0209917 A1 | 9/2005 | Anderson et al. |
| 2005/0209939 A1 | 9/2005 | Joseph et al. |
| 2005/0216346 A1 | 9/2005 | Kusumoto et al. |
| 2005/0222906 A1 | 10/2005 | Chen |
| 2005/0234769 A1 | 10/2005 | Jain et al. |
| 2005/0234773 A1 | 10/2005 | Hirst et al. |
| 2005/0240474 A1 | 10/2005 | Li |
| 2005/0240477 A1 | 10/2005 | Friday et al. |
| 2005/0242179 A1 | 11/2005 | Warwick |
| 2005/0246289 A1 | 11/2005 | Alexander et al. |
| 2005/0251446 A1 | 11/2005 | Jiang et al. |
| 2005/0251470 A1 | 11/2005 | Sullivan |
| 2005/0256794 A1 | 11/2005 | Colby |
| 2005/0267800 A1 | 12/2005 | Tietzen et al. |
| 2005/0273085 A1 | 12/2005 | Weidner |
| 2005/0273387 A1 | 12/2005 | Previdi |
| 2005/0278215 A1 | 12/2005 | Seele, Jr. |
| 2005/0288998 A1 | 12/2005 | Verma et al. |
| 2005/0289003 A1 | 12/2005 | Thompson et al. |
| 2006/0004629 A1 | 1/2006 | Neemann et al. |
| 2006/0010033 A1 | 1/2006 | Thomas |
| 2006/0010034 A1 | 1/2006 | Sparks |
| 2006/0011719 A1 | 1/2006 | Lehtonen et al. |
| 2006/0020507 A1 | 1/2006 | Sagey |
| 2006/0026073 A1 | 2/2006 | Kenny et al. |
| 2006/0036553 A1 | 2/2006 | Gupta et al. |
| 2006/0085330 A1* | 4/2006 | Imrey et al. |
| 2006/0085331 A1* | 4/2006 | Imrey et al. |
| 2006/0085332 A1* | 4/2006 | Imrey et al. |
| 2007/0011176 A1 | 1/2007 | Vishnubhotia |
| 2007/0124227 A1 | 5/2007 | Dembo |
| 2007/0156576 A1* | 7/2007 | Imrey et al. |
| 2007/0156580 A1* | 7/2007 | Imrey et al. |
| 2007/0156581 A1* | 7/2007 | Imrey et al. |
| 2009/0070247 A1 | 3/2009 | Simon et al. |

FOREIGN PATENT DOCUMENTS

| | | | |
|---|---|---|---|
| JP | 2002109435 A | * | 4/2002 |
| JP | 2002-163589 | | 6/2002 |
| JP | 2005-122748 | | 5/2005 |
| WO | WO 99/27479 | * | 6/1999 |
| WO | WO 00/02256 | | 1/2000 |
| WO | WO 01/11532 | | 2/2001 |
| WO | WO 02/069212 | | 9/2002 |
| WO | WO 2006-045060 | * | 4/2006 |
| WO | WO 2007-103574 | * | 9/2007 |
| WO | WO 2007-103575 | * | 9/2007 |
| WO | WO 2007-103576 | * | 9/2007 |

OTHER PUBLICATIONS

Pourmokhtar, A Hedge Fund Primer Version 0.1, www.emf.net/?farzin/hedgefund.html, printed Jul. 24, 2002, 5 pages.
At Your Request, www.wingspanbank.com, Sep. 28, 1999.
CSU/DSU (Channel Service Unit/Data Service Unit), CTI (Computer-Telephony Integration), pp. 208-210.
Markese, Can You Trust Mutual Fund Rankings?, Consumers' Research Magazine, vol. 76, No. 10, Research Library, Oct. 1993, p. 20.
Taylor et al., Card Issuers Turn to Scoring as They Face Increasing Risk, Financial Services Report, vol. 8, No. 15, Jul. 24, 1991, p. 1.
Jazzy Jeff, Credit Card Commentaries; cardoffers.com 2003.
Quinn, Credit Card Issuers Keeping a Closer Watch on How You Pay Bills, Washington Post, Staying Ahead, Business Section P6, Apr. 25, 1988, 1 page.
Friedland, Credit Scoring Digs Deeper into Data, Credit World, vol. 84, No. 5, May 1996, pp. 19-23.
Credit Scoring New Markets, Bank Technology News, vol. 9, No. 7, Jul. 1996, p. 1.
Derivatives Primer, CEIBA, Association for Financial Professionals, Committee on Investment of Employee Benefit Assets, Dec. 2001.
Cumby et al., Evaluating the Performance of International Mutual Funds, The Journal of Finance, vol. 45, No. 2, Jun. 1990, pp. 497-521.
Jameson, Expanding Risk Management Strategies: Key to Future Survival, Credit World, vol. 84, No. 5, May 1996, pp. 16-18.
FreeMarkets, printed on Apr. 26, 1999.
Armstrong, Fund of Funds: Perfect Solution or Dangerous Shortcut?, Investor Solutions, Inc., www.investorsolutions.com, printed Jul. 24, 2002.
GS-Calc 6.0.1.1.; JPS Development; http://download.com, printed Sep. 3, 2003.
Gottfried et al., Graphical definitions: making spreadsheets visual through direct manipulation and gestures, Visual Languages, 1997, Proceedings, 1997 IEEE Symposium on, Sep. 23-26, 1997, pp. 246-253, Abstract.
Hedge Fund Primer—The Basics, KSP Capital Management LLC, information@kspcapital.com, printed Jul. 24, 2002, 18 pages.
Hedge Fund Primer About Fund of Funds, Links Securities LLC, www.hedgefund.net/prime_fof.php3, 2002, 2 pages.
Kneis, Hedge Fund Strategies: A Primer, Canadianhedgewatch, p. 3.
Buchner et al., HotDoc: a flexible framework for spatial composition, Visual Languages, 1997, Proceedings, 1997 IEEE Symposium, Abstract, Sep. 23-26, 1997, pp. 92-99.
Asch, How the RMA/Fair Isaac credit-scoring model was built, Journal of Commercial Lending, vol. 77, No. 10, Jun. 1995, pp. 10-16.
Huddling With William Bernstein: Small Town Doctor, Investing Pro.

Snyder et al., Identifying design requirements using analysis structures, Aerospace and Electronics Conference, 1991, NAECON, 1991, vol. 2, Abstract, May 20-24, 1991, pp. 786-792.
Meredith, Internet bank moves closer to virtual reality, USA Today, May 5, 1995.
Kmart Mastercard—cardweb.com 2000.
Internet, Lending Tree, Mortgage Apply Online in Minutes, www.lendingtree.com, 7 pages, printed Feb. 1, 1999.
Hinds, Michael, Making the Most of Fast Falling Mortgage Rates.
Makuch, Managing Consumer Credit Delinquency in the US Economy: A Multi-Billion Dollar Management Science Application, Interfaces, Feb. 1992, pp. 90-109.
Reid, Alice, Metro Ready to Use High Tech Far System; Selling.
Bogle, Mutual Funds at the Millennium: Fund Directors and Fund Myths, The Vanguard Group to the '40 Act Institute of PLI (Practicing Law Institute), New York, NY, May 15, 2000, 15 pages.
Davenport et al., Numbers-a medium that counts [spreadsheet software]; Computer Graphics and Applications; IEEE; vol. 11; Issue 4; Abstract, Jul. 1991, pp. 39-44.
Opportunity Knocks at Scoring's Door, Collection and Credit Risk, vol. 2, No. 4, Apr. 1997, p. 53.
Stolte et al., Polaris: a system for query, analysis, and visualization of multidimensional relational databases; Visualization and Computer Graphics; IEEE Transactions on; vol. 8; Issue 1; Abstract, Jan./Mar. 2002, pp. 52-65.
Primer: Derivatives Instruments, Derivatives Study Center, www.econstrat.org/dsinstruments.htm, printed Jul. 24, 2002, 8 pages.
Chi et al., Principles for information visualization spreadsheets; Computer Graphics and Applications; IEEE; vol. 18; Issue 4; Abstract, Jul./Aug. 1998, pp. 92-99.
Product Data Integration Technologies, Inc., Step Integratin Authors, printed on Apr. 26, 1999.
Sullivan, Scoring Borrower Risk, Mortage Banking, vol. 55, No. 2, Nov. 1994, pp. 94-98.
Spreadsheet Mapper; www.panopticon.com., printed Oct. 1, 2003.
TCS 4.20; Telsys sas; http://download.com, printed Sep. 30, 2003.
McLaughlin, Tapping Web to Search for Right Fund—FundProfiler Speeds Search, Boston Herald, Boston, MA, Dec. 16, 1999, p. 70.
Carey, The Sub-Prime Credit Market: Identifying Good Risks for Unsecured Cards, Credit World, vol. 85, No. 1, Sep. 1996, pp. 13-15.
Portner, There Must be a Better Way, Mortgage Banking, vol. 53, No. 2, Nov. 1, 1992, pp. 12-22.
Trading and Capital-Markets Activities Manual, Instrument Profiles: Structured Notes, Federal Reserve System, The Turin Group, www.toerien.com/books/manual/4040.htm, printed Jul. 24, 2002, 14 pages.
Anonymous, Two Chips Can Be Better Than One.
Storms, Phillip, Using Mortgage Credit to Achieve Client Objectives, Journal of Financial Planning, ISSN/ISBN: 10403981, Proquest Document ID: 10403981, vol. 9, Issue 5, 9 pages, Oct. 1996.
Storms, Phillip, Using Mortgage Credit to Achieve Client Objectives, Journal of Financial Planning, ISSN/ISBN: 10403981; Proquest document ID:10403981; Denver: vol. 9; Issue 5; 9 pages, Oct. 1996.
Hickman, Using Software to Soften Big-Time Competition, Bank Systems and Technology, vol. 31, No. 8, Jun. 1994, pp. 38-40.
Spoerri, Visual tools for information retrieval; Visual Languages; 1993; Proceedings; 1993 IEEE Symposium on; pp. 160-168; Abstract.
Spirer, When Bad Credit Behavior Becomes the Norm, Credit World, vol. 85, Iss. 6, Jul./Aug. 1997, p. 18.
Why A Fund of Funds?, Altegris Investments, www.managedinvestments.com/hedge_fund_of_funds, printed Jul. 24, 2002.
U.S. Appl. No. 60/620,131, filed Oct. 19, 2004, Imrey et al.*
Hekman, Christine, A Financial Model of Foreign Exchange Exposure.

AmEx-Costco Co-brand Is it a Marketing or Merchant Acceptance Strategy, Card News, vol. 14, Iss. 16, Aug. 25, 1999.
Berliner, Uri, Berliner, Innovative Credit Card Fashions Take Hold Customized Plastic Good for Firms but Users Should Beware, San Diego Union Tribune, Eds. 1-8 Jun. 13, 1996, p. A1.
Brain, Robert, Brain, Sum and Substance Quick Review of Contracts, 4th Edition, Copyright 1997, pp. 79-80, 211.
Briggs, Vernon Jr, Briggs, The Mutual Aid Pact of the Airline Industry, Cornell University, 1965 (http://digitalcommons.ilr.cornell.edu/hrpubs/21).
Pae, Peter, Boycott Threat Spurs American Express to Rethink Fees.
Church, Vernon, Church, Technology Takes the Toll, Popular Science, New York, Mar. 1992, vol. 240, Iss. 3.
Conger, Greg M. and Zinder, Andrea, Conger et al., Grocers' Mutual Aid Pact Detailed—Unsealed Documents Show How the Chains Shared Sales and Tried to Outwit a Labor, United Food and Commercial Workers Union Local 324, Los Angeles Times, Feb. 5, 2005, 2 pages (Retrieved from the Internet on.
Cox, James, Cox, Sum and Substance Quick Review of Corporations, 2nd Edition, Copyright 1996.
Cremieux, Pierre-Yves, Cremiux, Does Strike Insurance Matter? Evidence from the Airline Industrys Mutual Aid Pact, Journal of Labor Research, Spring 96, vol. 17, Iss. 2, pp. 201-217.
Gross, Leonard, Gross, Chapter 4—Agent's Authority to Bind Principal to Contract, Agency and Partnership—The Professor Series, Copyright 1998, pp. 47-48.
Unknown, Grocers Disclose Details of Mutual Aid Pact, Management Ventures, Inc., 1 p., Feb. 9, 2005 (http//www.mventures.com).
Business and High Tech Editors Cardtech Securtech 2000, HyperSecur Corporations HyperProximity Technology Now Available, ST16HF52 Microprocessor Chip from STMicroelectronics, Business and High Tech Editors CardTech/SecurTech 2000, Business Wire, New York, May 2, 2000.
Jacoby, Edmund, Jacoby, Grocers' Pact Reveals Strategy, Complex Formula, North County Times, Feb. 10, 2005, 7 pages, (http//nctimes.com/articles/2005/02/08/news/state/2700560247.txt).
Kahn, Mark, Kahn, Mutual Strike Aid in the Airlines, Labor Law Journal, Jul. 1960, vol. 11, Iss. 7, p. 595.
Levine, Marvin et al, Levine et al., The Airlines Mutual Aid Pact—A Deterrent Collective Bargaining, Labor Law Journal, Jan. 1977, vol. 28, Iss 1., p. 44.
Schreiber, Ulrich et. al., Measuring the Impact of Taxation on Investment and Financing Decisions.
Microsoft Corp, Microsoft Corporation, Open Financial Exchange (OFX) Specification 2.0, Tax Extensions, Version 1.0, Jun. 30, 2000.
Unknown, National Retail Group Report—Apr. 22, 2004, Capital Pacific, Retrieved from the Internet on Feb. 10, 2006, 4 pages, (http//www.retailinvestment.com/News_NRG_4_22_04.asp).
Pullar Strecker, Tom, Pullar-Strecker, Kiwi Card Converts Unlikely to Lead Smart Revolution Little Support for Changes to Risk Allocation, 2nd Ed., Dominion, Wellington, New Zealand, Apr. 25, 2000.
Redman, Russell, Redman, Mondex Trial Whets Consumers E-Cash Appetite, Bank Systems & Technology, New York, vol. 37, Iss. 6, Jun. 2000.
Tei Wisconsin Chapter—Wisconsin Department of Revenue Liaison Meeting—Tax Executives Institute, The Tax Executive, Mar.-Apr. 1995.
Wall, Barbara W., Wall, Legal Watch California Court Unseals Supermarket Mutual Aid Agreement, Gannett News Watch, Retrieved from the Internet on Feb. 10, 2006 (http//www.gannett.com/go/newswatch/2005/february/nw0225-4.htm), 2 pages, Feb. 25, 2005.
Williams, Brian, Williams, Ways of Life Trading, Steck-Vaughn Company, Austin, TX, Copyright 1993.

* cited by examiner

400

| Program List | | | |
|---|---|---|---|
| 420 | 430 | 440 | 450 |
| Program Description | Elig | Excl | Status |
| Program 1 | Y |  | Not Offered |
| Program 2 | Y | Y | Not Offered |
| Program 3 | N | Y | Not Offered |
| Program 4 | N |  | Not Offered |
|  | N |  | Not Offered |
|  | N |  | Not Offered |

| Program Description | Excl | Status |
|---|---|---|
| Program 5 | Y | Not Offered |
| Program 6 | Y | Not Offered |
|  | Y | Not Offered |
| Select |  | Close |

410 → Program 1, Program 2, Program 3

460 → Program 5, Program 6

FIGURE 4

SYSTEM AND METHOD FOR DETERMINING ELEGIBILITY AND ENROLLING MEMBERS IN VARIOUS PROGRAMS

CROSS-REFERENCE TO RELATED APPLICATIONS

This application is a divisional application of U.S. patent application Ser. No. 11/745,320, filed May 7, 2007, which is a continuation of U.S. patent application Ser. No. 09/739,880, filed on Dec. 20, 2000, now U.S. Pat. No. 7,295,999 issued on Nov. 13, 2007, which is related by subject matter to U.S. patent application Ser. No. 09/391,460, filed on Sep. 8, 1999, now U.S. Pat. No. 7,409,364 issued on Aug. 5, 2008, the contents of all of which are incorporated herein by reference. Any disclaimer that may have occurred during the prosecution of the above-referenced application is hereby expressly rescinded.

BACKGROUND OF THE INVENTION

1. Field of the Invention

The present invention relates generally to a system and method for determining eligibility and enrolling eligible persons, such as credit card members, into appropriate programs, such as programs for the payment of past due or overdue accounts.

2. Description of the Prior Art

Credit cards allow users to receive immediate credit from the credit card issuer by purchasing items using the credit card, and then repaying the credit card issuer for the purchased items at a later date. Many credit card issuers (or "issuers") extend additional credit to credit card members (or "credit card holders" or "card holders") by permitting monthly payments of less than the total balance of the credit card account, in exchange for the payment of interest by the credit card member for the remaining balance of the credit card account. A credit card issuer may require minimum monthly payments from a credit card member to ensure that the balance on the credit card account is eventually paid in full.

Some credit card members are unable to pay even the minimum monthly payments to the credit card issuer and thus become delinquent. Various hardships, such as divorce, illness, loss of employment or reduction in income, may prevent a credit card member from making the required payments. Credit card members may also be prevented from making appropriate payments due to other obligations, such as mortgages, loans, and other credit card payments. Credit cards have become very widely used due to their ease of use, relative security, and extension of immediate credit. Thus, there is an increased number of delinquent credit card members.

As a result, many credit card issuers design payment programs for delinquent credit card members. The payment programs are often tailored to suit particular categories of hardships and circumstances such as those mentioned above. The card members are asked to commit to payment programs which suit them best, and still satisfactorily repay their debt to the issuer. Providing tailored payment programs encourages card members to make a commitment to repay. Card members are more likely to complete the payment programs if the requirements of the programs are matched with some of their particular needs.

Unfortunately, there are numerous shortcomings with existing payment program eligibility and enrollment systems. Credit card issuers may have difficulty determining which payment programs are appropriate and best for a particular card member, and then may have trouble committing the card members to enroll in the program. Issuers also have difficulty designing effective payment programs. These are significant drawbacks.

One problem may arise when some card members who are not eligible for a particular payment program are mistakenly offered that program anyway. Conversely, another problem may arise when a card member who is eligible for a payment program is not offered that program. Different payment programs may have certain initial conditions to be eligible for enrollment. For example, a payment program may have as an initial condition for eligibility that the delinquent card member has recently lost his or her job. Thus, some payment programs may be appropriate for some card members, but inappropriate for others. The issuer may not always apply correct and uniform standards for determining eligibility for the payment programs. Another problem may also arise when card members are offered one payment program when another payment program would have been more beneficial to the card issuer. In circumstances where a card member is eligible for more than one payment program, some of the payment programs may be more beneficial to the card issuer than others. These are all significant drawbacks to conventional eligibility and enrollment programs.

Another problem with prior art systems is determining in a timely manner those programs for which a card member is eligible for enrollment. The issuer may be required to obtain various information from a card member to determine if the card member is eligible for a particular program. Obtaining this information and determining eligibility may be a lengthy process. This inconvenience has the effect of discouraging the card member from enrolling in a payment program. The inconvenience taxes the issuer's resources as well. If a card member requests information on several payment programs before committing to any of them, then the inconvenience for both parties is compounded. Therefore, current systems discourage some card members from enrolling and are also burdensome for the card issuer.

Another drawback of current systems is obtaining feedback on which payment programs are most effective. The most effective payment programs both entice the card members and lead to repayment of the greatest possible portion of money owed to the card issuer. Current systems do not provide feedback about which programs perform well based on these two factors.

Other problems and drawbacks also exist. Although the problems and drawbacks of the prior art have been discussed in relation to a system and method for enrolling delinquent card members in repayment programs, these same problems and drawbacks exist in other systems for enrolling members.

SUMMARY OF THE INVENTION

An object of the invention is to overcome these and other existing drawbacks of present systems and methods.

Another object of the invention is to provide a system and method for accurately and consistently determining eligibility and enrolling persons in appropriate programs.

Another object of the invention is to provide a system and method for rapidly and easily determining eligibility and enrolling persons into appropriate programs.

Another object of the invention is to provide a system and method for providing feedback about which programs are the most enticing and useful to members.

Other objects and advantages of the present invention are explained below.

According to the invention, a program is selected, after which enrollment information is entered. The enrollment information is checked and verified, and the enrollment applications are checked for eligibility. The enrollment may be either accepted or declined. The possibility of reiterative enrollment in more than one program is provided. A system is provided for tracking which payment programs are the most enticing for later feedback analysis.

BRIEF DESCRIPTION OF THE DRAWINGS

FIG. 4 is an exemplary sample graphical user interface for use in practicing the method according to an embodiment of the invention.

DETAILED DESCRIPTION OF THE INVENTION

The present invention involves a system and method for determining eligibility in various enrollment programs. To assist in the explanation of the invention, a specific implementation thereof will now be described. In one embodiment of the invention, a system for determining eligibility and enrollment in credit card repayment programs assists a customer service representative ("CSR") who is speaking with the credit card members over a telephone. The system aids the CSR by determining which of several repayment programs is available to the member for enrollment and by providing the result to the CSR. The system also provides the CSR with information regarding each repayment program and prompts for other information which is required for enrollment in each repayment program. For example, the system may inform the CSR that a particular repayment program is intended only for those members suffering a hardship because of a lost job, and that enrollment in the program requires committing to a minimum monthly payment. Once the CSR has entered the member's enrollment information, the system checks to ensure that the information is correct or within acceptable ranges. For example, the system may check to see if the minimum monthly payment is within an acceptable range for the debt-level of the member. If all the information is acceptable, the system prompts the CSR to accept enrollment of the member in the repayment program. If enrollment is accepted, the system can update databases to record the enrollment and take other steps according to the repayment program plan. For example, the system may spawn the creation of a letter to the member confirming the enrollment and the minimum monthly payment that was agreed upon.

Figure 1:
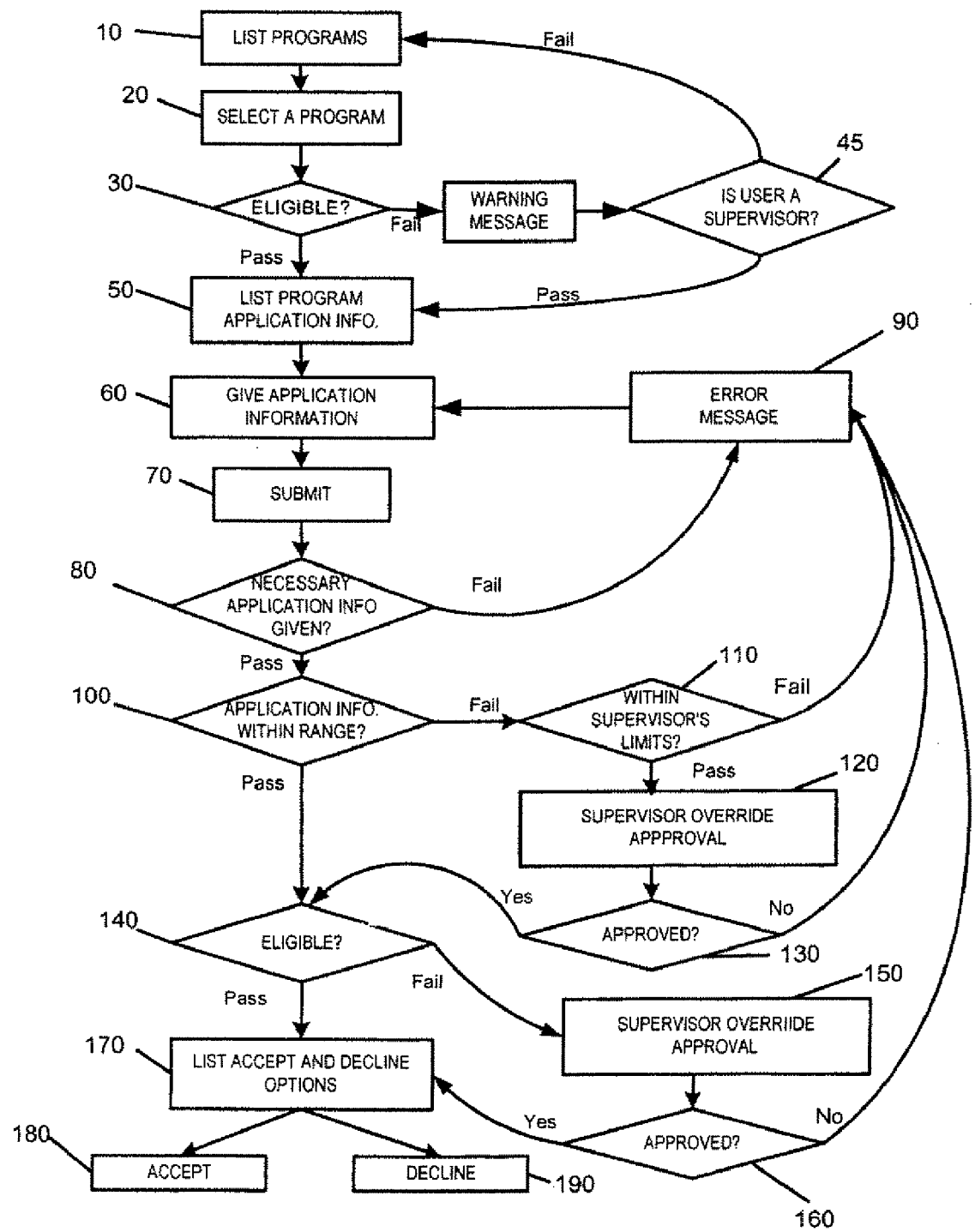
FIG. 1 is a flowchart of a method for determining eligibility and enrolling persons into appropriate programs according to a first embodiment of the present invention.

Having explained a specific implementation of the invention, a more general implementation will now be described. FIG. 1 illustrates a method for determining eligibility and enrolling persons in appropriate programs according to a first embodiment of the invention. At step 10, the available programs are listed. The available programs are all of the programs offered, regardless of eligibility. The programs may be listed in an order of decreasing desirability of enrolling a person in the program. In other words, the program which it is most desirable for the person to be enrolled in may be listed first on the list. One of the programs from the list is selected at step 20. Eligibility of a person to enroll in the selected program is determined at step 30. If the person is eligible to enroll at step 30, the program application information is immediately listed at step 50. Alternatively, if the person is not eligible, a warning message may be given at step 40, and it is determined whether the user is a supervisor (or another with authority to explore enrollment in ineligible programs) at step 45. If the user is not a supervisor, the available programs are again listed at step 10. If the user is a supervisor, program application information is listed at step 50. At step 60, information is collected for completing the application. The information collected for the application is submitted at step 70. At step 80, it is determined whether all of the necessary program application information has been submitted. If all of the necessary program application information has not been submitted, an error message is given at step 90, and program application information may be solicited at step 60 again. If all of the necessary program application information has been submitted, it is determined at step 100 whether the program application information is within a normal acceptable range. If any of the program application information is not within a normal acceptable range, it is determined at step 110 whether the values fall within a supervisor's override range. If any of the application information does not fall within a supervisor's override range, an error message is given at step 90. If all of the application information falls within a supervisor's override range, then a supervisor's override approval is solicited at step 120. At step 130, it is determined whether the supervisor's override is approved by a supervisor. If the application information override is not approved by a supervisor, an error message is given at step 90. If the application information override is approved, it is determined whether the person is eligible for the program at step 140. Also, if the application information does fall within a normal acceptable range at step 100, step 140 is performed. If it is determined that the person is not eligible for the program at step 140, a supervisor override is solicited at step 150. It is determined whether a supervisor's override approval has been obtained at step 160. If a supervisor's override approval is not obtained, then an error message is given at step 90. If a supervisor's override approval is obtained, or if the person is determined to be eligible for the program at step 140, then accept and decline options are given at step 170. The person either chooses to accept the program at step 180 or decline the program at step 190. After step 180 or 190, the application is closed and the enrollment is completed.

The method for determining eligibility and enrolling persons in appropriate programs explained above may be practiced in several different ways. According to an embodiment of the invention, the method may be practiced when the person enrolling speaks to a customer service representative ("CSR") on the telephone. A software application may aid the CSR and the person enrolling. The software application may display on the CSR's computer terminal the list of programs according to step 10, described above. The CSR and the person enrolling may interact over a telephone, where the CSR reads the list of programs to the person enrolling, who may then provide a program selection to the CSR according to step 20, described above. The CSR enters the enrolling person's selection into the CSR's computer terminal, and the software application may perform a routine to determine the enrolling person's eligibility according to step 30, described above.

According to another embodiment, the above method may be practiced through the Internet. The person enrolling views a web page where a software application, implementing the above method, causes to be displayed on the web page the list of programs according to step 10, described above. The person enrolling selects a program for enrollment and submits his or her selection, using the web browser, to the web server according to step 20, described above. The web server submits the enrolling person's selection to a software routine where the eligibility of the person to enroll in that program is determined according to step 30, described above. According to this way of practicing the method, a CSR is not required, but may nonetheless be used.

According to a further embodiment, the above method may be practiced by communicating with an automatic voice messaging and information gathering system over a telephone. Such systems are sometimes referred to as "automatic voice response" (AVR) or "voice response units" (VRU). The automatic voice messaging system could speak to the person enrolling, over the telephone, the list of programs according to step 10, described above. The person enrolling could submit to the automatic voice messaging and information gathering system his or her program choice according to step 20, described above, by pushing a key on his or her telephone keypad or by speaking a number, which selection would be recorded by the automatic voice messaging and information gathering system. A software application for the above method could then receive the enrolling person's program selection and determine the enrolling person's eligibility for the program according to step 30, described above. These are but a few examples of the ways in which the above method for determining eligibility and enrolling persons into appropriate programs may be practiced.

Figure 2A:
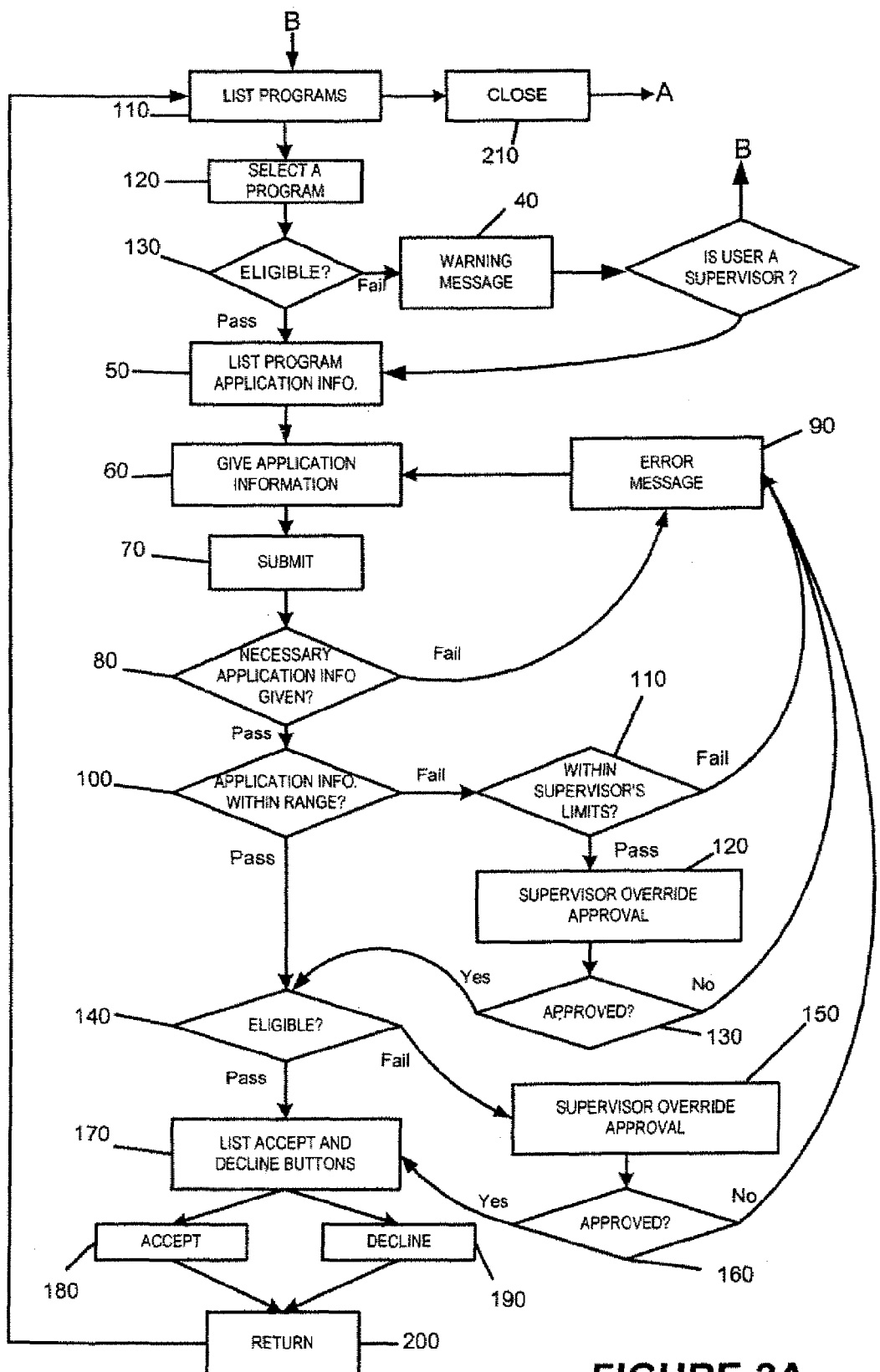
FIGS. 2A and 2B are flowcharts depicting a method for determining eligibility and enrolling persons into appropriate programs according to another embodiment of the present invention.
Figure 2B:
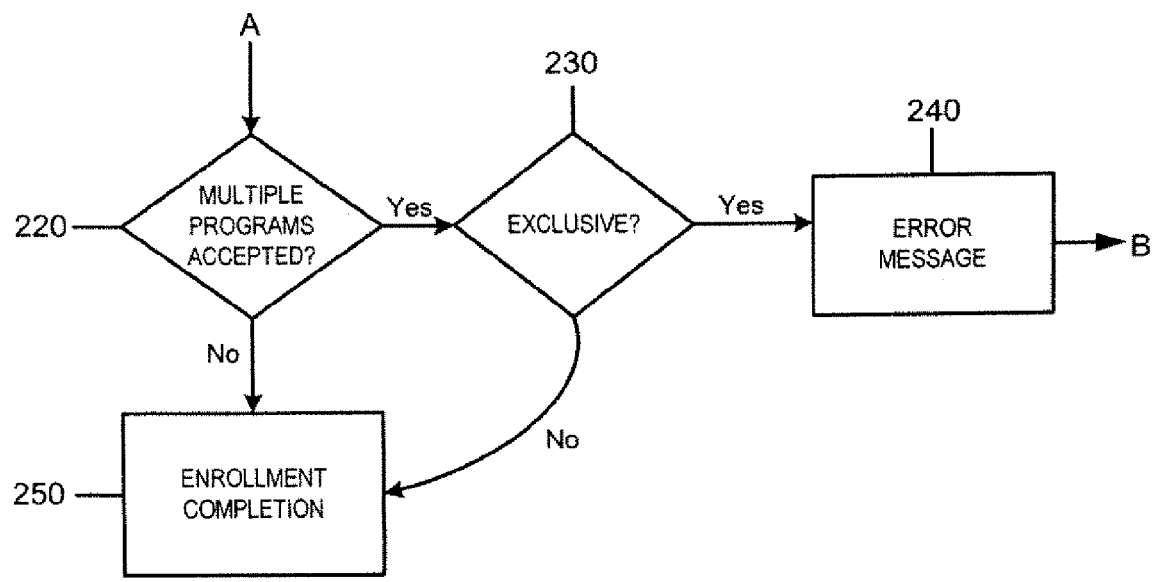

FIGS. 2A and 2B illustrate a method for determining eligibility and enrolling persons into appropriate programs according to another embodiment of the present invention. In this embodiment, more than one enrollment program may be selected through an iterative process. If enrollment in some of the programs is exclusive of other programs, then one or more programs must be declined before the enrollment is completed. This embodiment is similar to the previous embodiment except that, after the steps 180 and 190 of declining or accepting enrollment in a program, the method returns at step 200 to step 10, where the available programs are again listed. A person may select another program at step 20 and continue to follow the method as described previously. Thus, the method is iterative in that a substantially similar set of steps may be repeated several times in order to accept enrollment in one or more programs according to the method of this embodiment. At step 10, a close option may be selected at step 210, in which case the method proceeds to A in FIG. 2B.

Beginning at A in FIG. 2B, a determination is made whether there are multiple accepted programs at step 220. If multiple programs have been accepted, at step 230 a determination is made whether enrollment in any of the accepted programs is exclusive of enrollment in any other accepted programs. If enrollment in any of the programs is exclusive, then an error message is given at step 240, and the process then passes to B in FIG. 2A, where the available programs are again listed according to step 10, described above. If it is determined that there are not any accepted programs which are exclusive of any other accepted programs, then the enrollment is completed at step 250.

The enrollment completion step 250, described above, may comprise steps for recording which programs were accepted and which programs were declined. When this information is recorded for each person involved in enrollment in the programs, the information can be gathered together and later studied to help determine which programs are the most enticing programs to enrolling persons, and, based on repayment performance, which are the most effective programs.

A further embodiment of a method for determining eligibility and enrolling members in various programs according to the present invention will now be described in connection with FIGS. 3A and 3B. This particular embodiment is suited for determining the eligibility of and enrolling credit card members in payment programs. This particular embodiment is also suited to be practiced with a software application that has been created to help either a CSR or a credit card member follow the method.

Figure 3A:
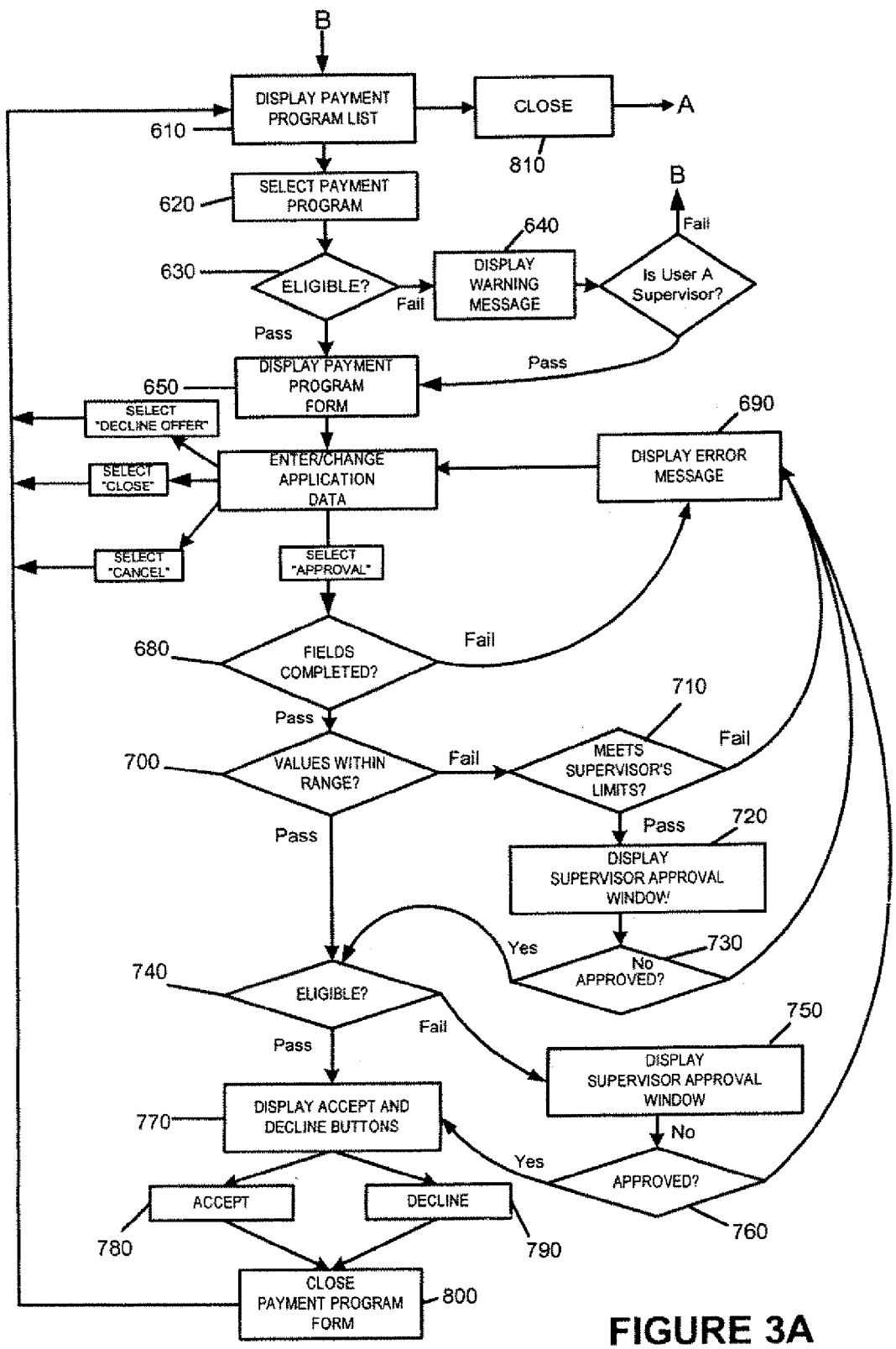
FIGS. 3A and 3B are flowcharts depicting a method for determining eligibility and enrolling persons into appropriate programs according to another embodiment of the present invention.

In this embodiment a list of payment programs will be displayed on a graphical user interface, according to step 610, FIG. 3A. A schematic example of a graphical user interface 400 including a list of payment programs is illustrated in FIG. 4. In this example of a payment program list, the different payment programs available for enrollment are displayed in rows 410. The payment program list includes a column 420 providing a description of each payment program. The list may also include other columns providing other information for the programs. For example, a column 430 may provide information on whether the member is eligible for that particular payment program. Another column 440 may provide information on whether the payment program is exclusive of other payment programs. Another column 450 may include information on whether the payment program was offered to the member in the past, and if so, whether the program was accepted or declined. Rows 460 may also be included and will display programs grouped according to another criteria. For example, rows 460 may display programs for which there are no eligibility requirements—all members are eligible for these programs.

This program list also includes two option buttons: "select" and "close." By selecting the "select" button, a program, previously preliminarily selected by the user through a method such as highlighting, is finally selected, according to step 620, FIG. 3A. By selecting the "close" button, the iterative process of selecting and enrolling in payment programs ends, according to step 810. Buttons may be selected using conventional manners of selection (e.g., clicking on a button with a mouse).

At step 630, an eligibility check is performed to determine if the member is eligible for the payment program selected in step 620. For example, eligibility to enroll in a particular payment program might be limited to credit card members who owe less than a predetermined amount to the issuer. If the enrolling person is determined to be eligible for enrollment at step 630, the program form is immediately displayed at step 650. Alternatively, if the enrolling person is not eligible for enrollment, then a warning message will be displayed at step 640. At step 645, it is determined if the user is supervisor (or another person permitted to proceed with an ineligible application). If the user is not a supervisor, then the program list is displayed at step 610. If the user is a supervisor, then the program form is displayed at step 650. Application data is entered into the application at step 660.

Figure 5:
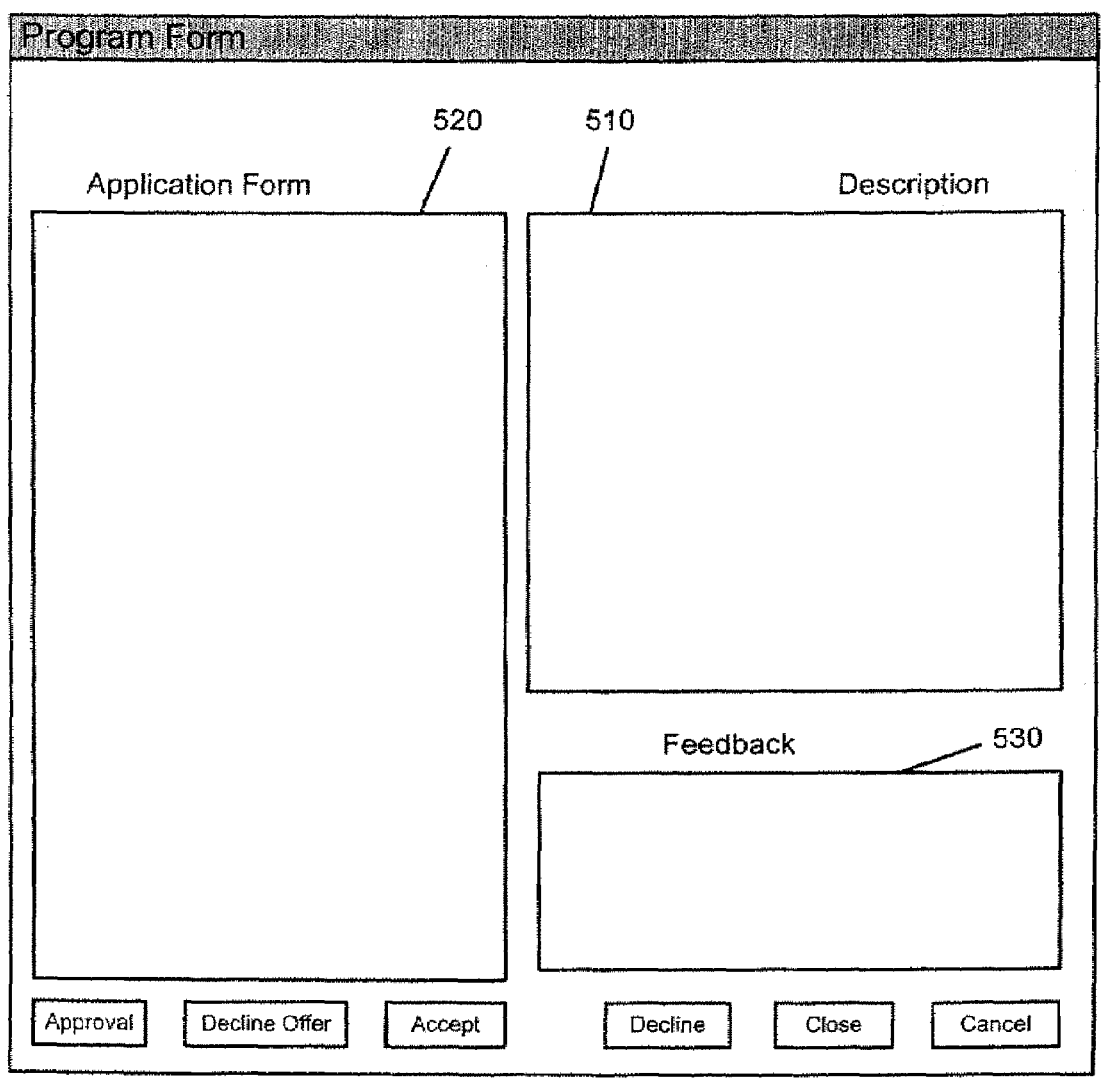
FIG. 5 is an exemplary sample graphical user interface for use in practicing the method according to an embodiment of the invention.

FIG. 5 schematically illustrates one example of a graphical user interface 500 containing a program form according to the present embodiment of the invention. In this example, the program form contains a description area 510, an application form area 520, and a feedback area 530. The description area 510, the application form area 520, and the feedback area 530, will be pertinent to the particular payment program selected in step 620. In the description area 510, information about the payment program is displayed. This information might include a description of the card members who are best suited for the payment program, advantages of the payment program, and other useful information. In the application form area 520, payment program enrollment information is solicited and entered, and may be organized into distinct fields to facilitate entering and gathering the enrollment information. The options may include payment amounts, payment dates, interest rates, etc. In the feedback area 530, feedback about the enrollment process may be displayed. For example, after submitting the enrollment information for a program for approval, the status of the approval, whether it is approved or denied, may be displayed in the feedback area 530.

The program form may also comprise six option buttons: "approval," "decline offer," "accept," "decline," "close," and "cancel." If the card member is not interested in enrolling in the payment program after the program form has been displayed and the payment program has been explained to the card member, selecting the "decline offer" button will close the payment program form and the payment program list will again be displayed. By selecting the "close" button, the payment program form is closed, but any payment program enrollment information already entered in the application form area 520 is retained for possible future use. By selecting the "cancel" button, the payment program form is closed and no information contained in the form is retained.

After completing the payment program enrollment information in the application form area 520, choosing the "approval" button will submit the enrollment information in the application form 520 area to be checked to determine if all of the necessary fields have been completed, according to step 680, FIG. 3A. If all of the necessary fields have not been completed, an error message is displayed at step 690, and payment program enrollment information may be completed at step 660 again. If all of the necessary fields have been completed, it is determined at step 700 whether the payment program enrollment information is within a normal acceptable range. For example, if a monthly payment amount is included in the payment program enrollment information to be entered in step 660, then there may be a requirement for a minimum amount for the monthly payment. At step 700 it would be determined if the monthly payment amount entered at step 660 meets the minimum monthly payment requirement. If any of the payment program enrollment information is not within a normal acceptable range, it is determined at step 710 whether the information falls within a supervisor's override range. If any of the payment program enrollment information does not fall within a supervisor's override range, an error message is displayed at step 690. If all of the payment program enrollment information falls within a supervisor's override range, then a supervisor's override approval is solicited at step 720. At step 730, it is determined whether the supervisor's override is approved by a supervisor. If the supervisor's override is not approved by a supervisor, an error message is displayed at step 690. If the supervisor's override is approved, it is determined whether the member is eligible for the payment program at step 740. Also, if the payment program enrollment information does fall within a normal acceptable range at step 700, step 740 is performed. If it is determined that the member is not eligible for the payment program at step 740, a supervisor's override is solicited at step 750. It is determined whether a supervisor's override has been approved at step 760. If a supervisor's override is not approved, then an error message is displayed at step 690. If a supervisor's override is approved, or if the member is determined to be eligible for the payment program at step 140, then the "accept" and "decline" option buttons are displayed on the program form at step 770.

By selecting the "decline" button at step 790, enrollment in the payment program is not accepted and the payment program form is closed at step 800. By selecting the "accept" button at step 780, enrollment in the payment program is accepted by the card member and the payment program form is closed at step 800. The program list is then again displayed at step 610.

In this embodiment, as in the embodiment depicted by FIGS. 2A and 2B, one or more payment programs may be viewed, approved, and enrolled in during an iterative enrollment session. When it is desired to complete the enrollment session, the "close" option button is selected at step 810 and the iterative session stops. A check is performed at 820, FIG. 5 to determine if the card member has enrolled in more than one payment program. If the card member has enrolled in more than one payment program, it is further determined at 830 whether any of the payment programs are exclusive of other payment programs. If any of the payment programs are exclusive of other payment programs, an error message is displayed at 840. After the error message is displayed at 840, the program list is again displayed at 610, FIG. 3A. This allows one or more of the enrolled-in payment programs to be selected at step 620, and for enrollment in that payment program to be declined by following the method explained above and selecting the "decline" button at step 790. This process will resolve any conflicts between mutually exclusive payment programs detected at step 830. If multiple payment programs are not detected at step 820, or if no exclusive payment programs are detected at step 830, then enrollment will be completed at step 850.

Figure 6:
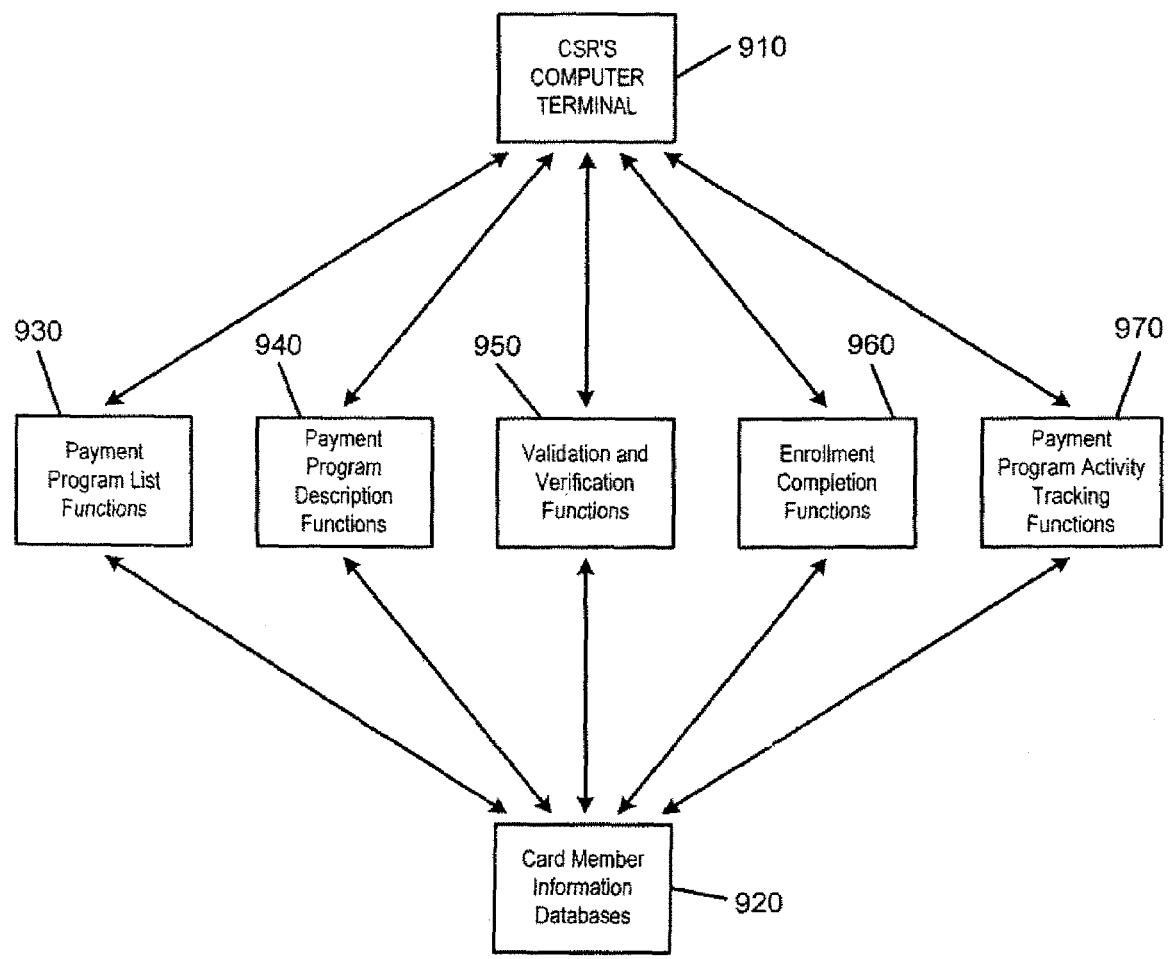
FIG. 6 is a schematic diagram representing a system for practicing the method according to an embodiment of the invention.

FIG. 6 schematically depicts a system 900 used to practice the method of the third embodiment. The system 900 comprises a CSR's computer terminal module 910, information database module 920, payment programs list module 930, payment program description module 940, validation and verification module 950, enrollment completion module 960, and payment program activity tracking module 970. The CSR's computer terminal module 910 may include a CPU, a screen, a keyboard, etc., as is well known. The information database module 920 may comprise computer readable databases which may be stored on the CSR's computer terminal, or in another computer separate from the CSR's computer terminal but connected to the CSR's computer terminal through an information sharing network. Various processing modules 930, 940, 950, 960, and 970 are designed to effectively share and process information between the information databases 920 and the CSR's computer terminal module 910 according to predetermined functions. These modules may be defined by computer readable code stored and executed on the CSR's computer terminal module 910 or on another computer separate from the CSR's computer terminal module 910 but connected to the CSR's computer terminal through an information sharing network such as a LAN, WAN, Internet, or similar network.

The payment program list module 930 will aid in the displaying of the payment program list according to step 610, FIG. 3A. As previously explained, the payment program list includes a list of the available payment programs, and may further include information on whether a card member is eligible for the payment programs, whether the card member is already enrolled in a payment program, or has been offered a payment program but previously declined, or whether a payment program is exclusive of other payment programs.

The payment program list module 930 may aid in the displaying of the payment program list by providing information from the information databases 920 to the CSR's computer terminal 910 to help populate the payment program list. The payment program list module 930 may also categorize the payment programs in an order from the most desirable to the least desirable, based upon predefined strategies.

The payment program description module 940 will aid in the displaying of the payment program description window according to step 650, FIG. 3A, and as illustrated in exemplary FIG. 5. As previously described, the payment program description window may include descriptive information about the selected payment program. The descriptive information may include information customized to the enrolling card member. For example, the descriptive information may include suggested payment dates, and the suggested payment dates may be based upon the billing cycle for the enrolling card member. Or, the descriptive information may include suggested payment amounts or interest rates, and the suggested payment amounts or interest rates may be based upon the enrolling card members account balance or previous interest rate. The payment program description module 940 will aid in the displaying of the payment program description window by providing information from the information databases 920 to help populate the payment program description window.

The validation and verification module 950 will aid in all of the data checking and determinations of the present invention (e.g., steps 680, 700, 710, etc. of FIG. 3A). The validation and verification module 950 provides information from the information databases 920 about normal ranges for payment program enrollment information, supervisor override ranges for payment program enrollment information, etc. The validation and verification functions may also provide information about the card member's account from the information databases 920 to aid in the data checking and determinations.

Figure 3B:
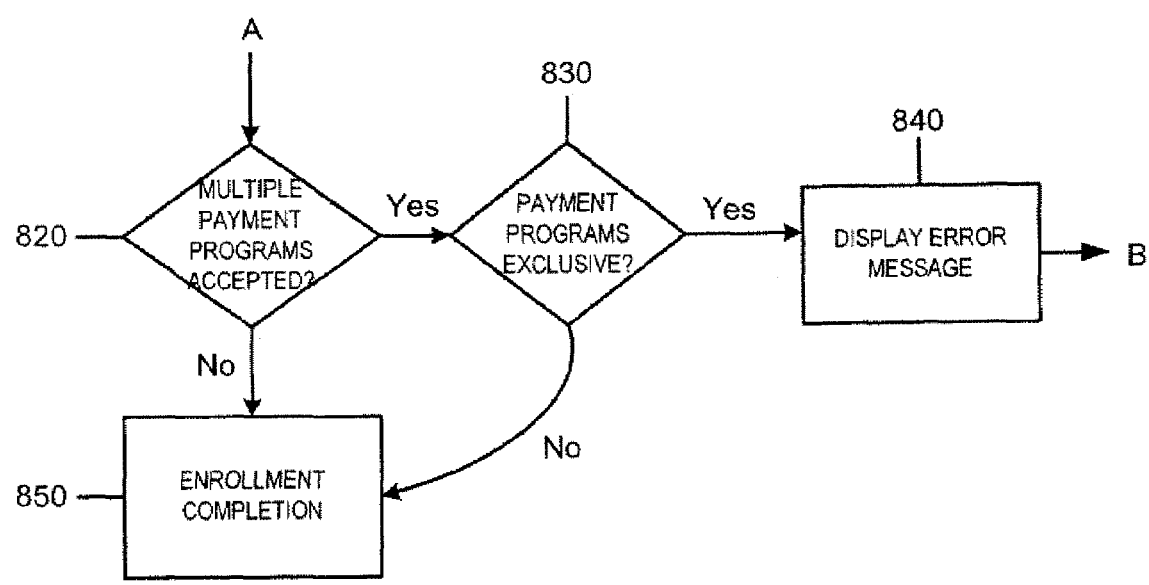

The enrollment completion module 960 will aid in enrollment completion, step 850, FIG. 3B. The enrollment completion module 960 may store information about payment program enrollment acceptance and payment program enrollment information in the information databases 920. The enrollment completion module 960 may also trigger the creation of letters to the card member, the transfer of funds between accounts, etc.

The account activity tracking module 970 may aid in determining which payment programs are the most enticing to card members and the most effective. The account activity tracking module 970 may store information in the information databases 920 about how many times each payment program is offered to card members and how often the payment program is declined or accepted or any other outcome which is desired to track.

Other embodiments, uses and advantages of the present invention will be apparent to those skilled in the art from consideration of the specification and practice of the invention disclosed herein. The specification and examples should be considered exemplary only. The intended scope of the invention is only limited by the claims appended hereto.

We claim:

1. A system for enrolling an individual who has a financial obligation to a third party in a payment program comprising:
   at least one processor;
   at least one computer having a display operatively connected to the at least one processor and an input device operatively connected to the at least one processor, wherein the at least one computer comprises a first computer that communicates with a second computer through an information sharing network;
   an interactive user application running on the at least one processor; and
   a graphical user interface generated by the interactive user application and displayed on the display, the graphical user interface displaying a list of payment programs;
   the graphical user interface further providing an interface for displaying a description of the listed payment programs on the display and for receiving enrollment information regarding a payment program and enrolling the individual in a payment program based at least in part on the enrollment information.

2. The system of claim 1, wherein the description of the payment programs displayed by the interface comprises a payment date, a payment amount, and an interest rate.

3. The system of claim 1, wherein the at least one processor is programmed to determine whether the individual is eligible to enroll in a payment program based at least in part upon financial status information of the individual provided by the at least one processor.

4. The system of claim 3, wherein the financial status information comprises account information of the individual.

5. The system of claim 4, wherein the account comprises a credit card account.

6. The system of claim 1, wherein the list of payment programs comprises a plurality of payment programs in which the individual is eligible to enroll.

7. The system of claim 1, wherein the one or more payment programs comprise payment programs for payment of past due accounts.

8. The system of claim 1, wherein the at least one processor is programmed to determine whether the payment programs are declined or accepted by the individual.

9. The system of claim 1, wherein the interface comprises an application form which includes enrollment information fields.

* * * * *